US008815165B2

(12) United States Patent
Walker

(10) Patent No.: US 8,815,165 B2
(45) Date of Patent: Aug. 26, 2014

(54) SYSTEMS AND METHODS FOR DISTRIBUTING PARTICULATE MATERIAL INTO A PARTICULATE VESSEL AND FCC UNITS INCLUDING THE SYSTEMS

(75) Inventor: Patrick D. Walker, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 212 days.

(21) Appl. No.: 13/330,481

(22) Filed: Dec. 19, 2011

(65) Prior Publication Data

US 2013/0156650 A1    Jun. 20, 2013

(51) Int. Cl.
*B01J 8/00* (2006.01)
*B01J 8/12* (2006.01)
*B01J 8/18* (2006.01)
*B01J 8/24* (2006.01)
*B01J 19/00* (2006.01)

(52) U.S. Cl.
USPC ........... 422/144; 422/129; 422/139; 422/140; 422/145

(58) Field of Classification Search
CPC ................ B01J 7/00; B01J 19/00; B01J 8/00; B01J 8/002; B01J 8/003; B01J 8/008; B01J 8/0015; B01J 8/12; B01J 8/125; B01J 8/18; B01J 8/1809; B01J 8/1818; B01J 8/1827; B01J 8/1872; B01J 8/226; B01J 8/24; B01J 8/28; B01J 8/44; B01J 2523/00; B01J 2208/00752; B01J 2208/00761; B01J 2208/00769
USPC .......................... 422/129, 139, 140, 144, 145
See application file for complete search history.

(56) References Cited

U.S. PATENT DOCUMENTS

| 3,674,668 | A | * | 7/1972 | Bjornson et al. | 204/171 |
| 4,828,802 | A | | 5/1989 | Colvert et al. | |
| 4,968,409 | A | | 11/1990 | Smith | |
| 5,006,495 | A | * | 4/1991 | Pappal et al. | 502/42 |
| 5,773,378 | A | | 6/1998 | Bussey et al. | |
| 6,835,302 | B2 | | 12/2004 | Cammy et al. | |
| 7,368,090 | B2 | | 5/2008 | Myers et al. | |
| 7,585,470 | B2 | * | 9/2009 | Hedrick et al. | 422/145 |
| 7,744,744 | B1 | | 6/2010 | Palmas et al. | |

OTHER PUBLICATIONS

Geldart, D. et al., "Studies on the intermittent discharge of coarse solids ((e.g., spent catalyst)) from fluidised beds," Chem. Eng. Res. Des. vol. 61 No. 4 p. 224-32; Jul. 1983.
Jiao, W., et al., "Revamping of regeneration system in RFCC unit," Petroleum Refinery Engineering, vol. 34, No. 7, p. 20-22; Jul. 25, 2004.

* cited by examiner

*Primary Examiner* — Natasha Young
(74) *Attorney, Agent, or Firm* — James C Paschall

(57) ABSTRACT

A system for distributing particulate material into a particulate vessel includes a particulate material distributor for introducing the particulate material into the particulate vessel. The particulate material distributor includes a declined header that defines a plurality of orifices that are spaced along a length of the declined header for accommodating flow of particulate material from the declined header. The system also includes a vessel level controller for controlling a level of the particulate material in the particulate vessel. The vessel level controller controls flow of the particulate material through one or more of the orifices in the declined header through adjustment of the level of particulate material in the particulate vessel between the plurality of orifices in the declined header. A FCC unit including the system is also provided, along with a method for distributing particulate material into a particulate vessel using the system.

20 Claims, 3 Drawing Sheets

SYSTEMS AND METHODS FOR DISTRIBUTING PARTICULATE MATERIAL INTO A PARTICULATE VESSEL AND FCC UNITS INCLUDING THE SYSTEMS

FIELD OF THE INVENTION

The present invention generally relates to systems and methods for distributing particulate material into a particulate vessel and fluidized catalytic cracking (FCC) units for the fluidized catalytic cracking of hydrocarbons including the systems. In particular, the present invention relates to systems, methods and FCC units that enable excellent horizontal distribution of particulate material in the particulate vessel.

DESCRIPTION OF THE RELATED ART

There are a number of processes employing particulate distribution systems in which particulate materials are introduced into a particulate vessel in fields such as, for example, food processing, industrial fabrication, and energy generation. One specific example of such a process is employed in fluid catalytic cracking (FCC) units for the conversion of relatively high boiling point hydrocarbons to lighter boiling hydrocarbons in the heating oil or gasoline (or lighter) range. In FCC units, hydrocarbon feed is contacted in one or more reaction zones with a particulate cracking catalyst that is maintained in a fluidized state under conditions suitable for the conversion of hydrocarbons. The heavy hydrocarbons in the feed crack to lighter hydrocarbons. During cracking, carbonaceous hydrocarbons or "coke" deposit on the catalyst to yield "coked" or "spent" catalyst. The converted hydrocarbons are then separated from the coked or spent catalyst. The spent catalyst is then stripped of volatiles, usually by steam, and then is regenerated in a catalyst regenerator. In the catalyst regenerator, the coke is burned from the catalyst with oxygen-containing gas, usually air. Flue gas formed by burning the coke in the regenerator may be treated for removal of particulates and conversion of carbon monoxide, after which the flue gas is normally discharged into the atmosphere. Particulate distribution systems are employed for introducing the spent catalyst into the catalyst regenerator.

Emphasis on the environmental importance of reduced $NO_x$ formation in flue gas has prompted much work in various areas. $NO_x$, or oxides of nitrogen, comes mainly from the oxidation of nitrogen compounds in the hydrocarbon feed, with perhaps some slight additional nitrogen fixation, or conversion of molecular nitrogen ($N_2$) to $NO_x$ in regenerator air. Poorly fluidized regions of spent catalyst in the catalyst regenerator may lead to localized areas of high oxygen concentration, leading to a higher rate of $NO_x$ formation.

Process approaches have been pursued to reduce $NO_x$ formation in flue gas from the FCC regenerators. One such process approach has focused upon enhancing distribution of particulate catalyst into the catalyst regenerator, which can minimize poorly fluidized regions of spent catalyst in the catalyst regenerator and, thus, minimize production of $NO_x$. In one development, radial distributor for radially discharging spent catalyst into the catalyst regenerator was proposed. However, the radial distributor may require special process configurations to implement and may not be feasible when the catalyst regenerator is configured to receive spent catalyst through a sidewall thereof. In another development, a header was proposed for feeding spent catalyst through a sidewall of the catalyst regenerator. In particular, the header is in fluid communication with a fluidized hopper that receives spent catalyst through the sidewall of the catalyst regenerator, and fluidized spent catalyst is horizontally transported through the header for distribution in the catalyst regenerator. However, the header and fluidized hopper are static equipment and, once installed, it is difficult to control horizontal travel distance of fluidized spent catalyst into the catalyst regenerator.

Horizontal transport of spent catalyst is very difficult. Spent catalyst will readily mix vertically due to vertically rising bubbles in the catalyst regenerator. However, no such internal mechanism exists in the catalyst regenerator for horizontally mixing the spent catalyst. Therefore due to the static nature of the header and fluidized hopper, and further due to the horizontal configuration of the header, it is difficult to control horizontal mixing of the spent catalyst within the catalyst regenerator. Depending on design flow parameters, horizontal spent catalyst distribution may be uneven within the catalyst regenerator, resulting in buildup of spent catalyst on one side or the other of the catalyst regenerator, poor mixing, and/or afterburn.

Accordingly, it is desirable to provide systems and methods for distributing particulate material into a particulate vessel and fluidized catalytic cracking (FCC) units for the fluidized catalytic cracking of hydrocarbons including the systems that enable excellent horizontal distribution of particulate material in the particulate vessel. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Systems and methods for distributing particulate material into a particulate vessel and fluidized catalytic cracking (FCC) units for the fluidized catalytic cracking of hydrocarbons are provided herein. In an embodiment, a system for distributing particulate material into a particulate vessel includes a particulate material distributor for introducing the particulate material into the particulate vessel. The particulate material distributor includes a declined header that defines a plurality of orifices that are spaced along a length of the declined header for accommodating flow of particulate material from the declined header. The system also includes a vessel level controller for controlling a level of the particulate material in the particulate vessel. The vessel level controller controls flow of the particulate material through one or more of the orifices in the declined header through adjustment of the level of particulate material in the particulate vessel between the plurality of orifices in the declined header.

In an embodiment of a fluidized catalytic cracking unit for the fluidized catalytic cracking of hydrocarbons, the fluidized catalytic cracking unit includes a reaction zone in which particulate catalyst is contacted with a hydrocarbon feed, a separator vessel in fluid communication with the reaction zone, a regeneration zone in fluid communication with the separator vessel and also in fluid communication with the reaction zone. The separator vessel receives an effluent that includes entrained particulate catalyst from the reaction zone and separates particulate catalyst from the effluent. The regeneration zone receives particulate catalyst from the separator vessel and passes regenerated catalyst from the regeneration zone to the reaction zone. The regeneration zone includes a particulate vessel for receiving the particulate catalyst, and the regeneration zone also includes a particulate material distributor for introducing the particulate catalyst into the particulate vessel. The particulate material distributor includes a declined header that defines a plurality of orifices that are spaced along a length of the declined header for accommodating flow of particulate catalyst from the declined header into the particulate vessel. The fluidized catalytic cracking unit also includes a vessel level controller for controlling a level of the particulate catalyst in the particulate vessel. The vessel level controller controls flow of the particulate catalyst through one or more of the orifices in the declined header through adjustment of the level of particulate catalyst in the particulate vessel.

In an embodiment of a method of distributing particulate material in a particulate vessel, particulate material is introduced into the particulate vessel with a particulate material distributor. The particulate material distributor includes a declined header that defines a plurality of orifices that are spaced along a length of the declined header for accommodating flow of particulate material from the declined header. A level of particulate material in the particulate vessel is sensed with a vessel level controller. The level of particulate material in the particulate vessel is adjusted between the plurality of orifices in the declined header based upon the sensed level of particulate material in the particulate vessel to control flow of the particulate material through one or more of the plurality of orifices in the declined header.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Systems and methods for distributing particulate material into a particulate vessel and fluidized catalytic cracking (FCC) units for the fluidized catalytic cracking of hydrocarbons including the systems are provided. As described in further detail below, the systems are particularly useful for addressing traditional problems with horizontal distribution of the particulate material in the particulate vessel that are attendant with existing feeding systems. Horizontal distribution refers to distribution of particulate material along a plane that is perpendicular to gravitational forces, i.e., along a width or diameter of the particulate vessel. While the systems for distributing particulate material into the particulate vessel are suitable for use in FCC units, where the particulate material is particulate catalyst, it is to be appreciated that the systems may be useful for any application in which particulate material is distributed into a particulate vessel and where horizontal distribution of the particulate material is a consideration, e.g., for purposes of achieving uniform processing conditions within the particulate vessel, weight distribution of particulate material within the particulate vessel, etc. In this regard, the particulate material is not limited to particulate catalyst and may include other materials such as, but not limited to, sand, gravel, or particulate minerals; grain or particulate food material; pelletized materials such as polymers; or any other type of material in particulate form. Further, the particle size of the particulate material is not limited so long as the particulate material is flowable. For example, the particulate material may have an average particle size of from about 0.01 µm up to and including 1 inch in diameter, such as from about 0.01 to about 100 µm. In one embodiment, the particulate material is capable of fluidization and has an appropriate particle size distribution to enable fluidization to be achieved.

Figure 1:
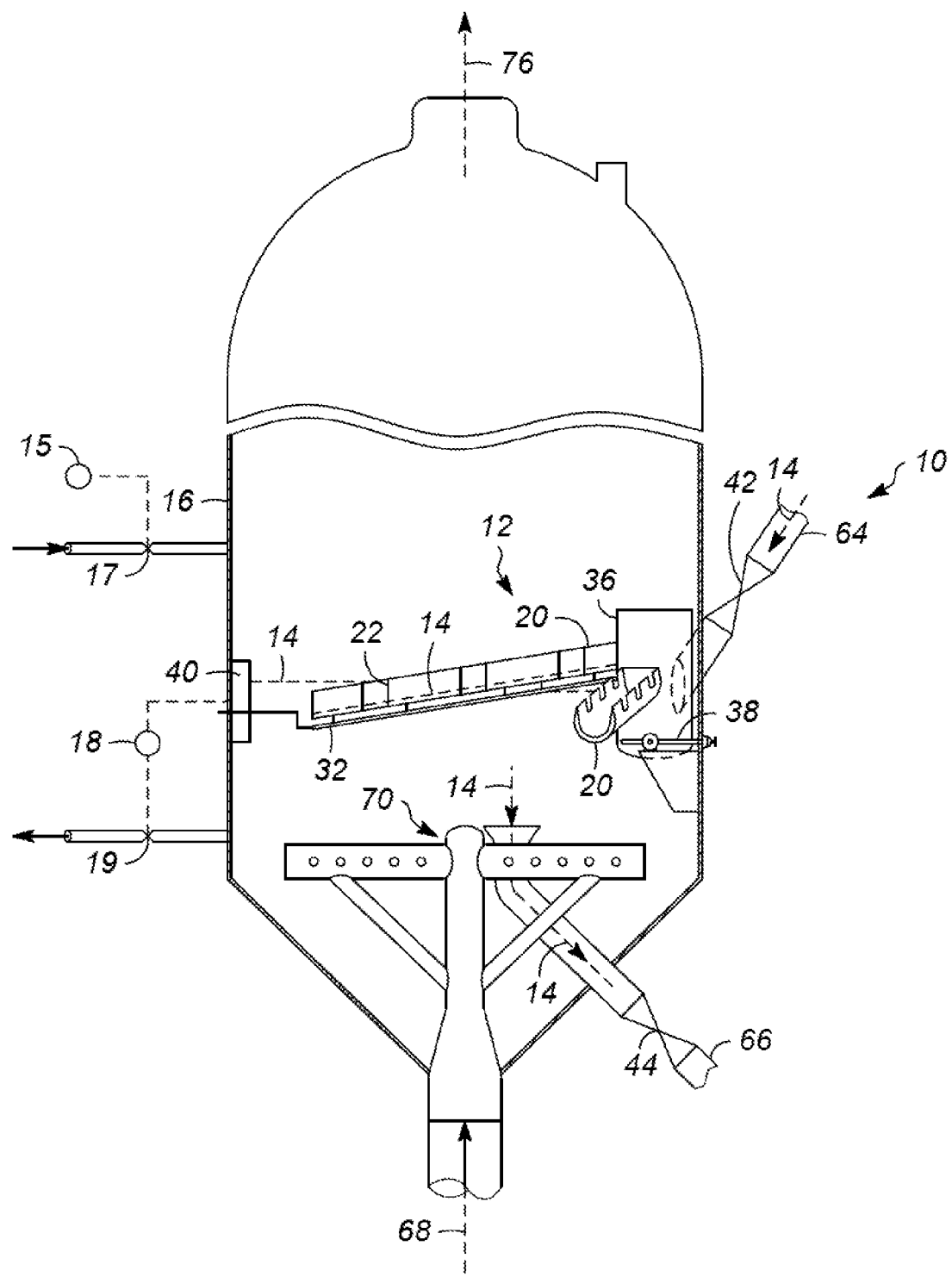
FIG. 1 is a schematic side view of a particulate vessel and a system for distributing particulate material into the particulate vessel in accordance with one embodiment.

Referring to FIG. 1, the systems 10 include a particulate material distributor 12 for introducing particulate material 14 into a particulate vessel 16 and a vessel level controller 18 for controlling a level of the particulate material 14 in the particulate vessel 16. In an embodiment, the particulate vessel 16 is a regenerator vessel used in a FCC unit 46, as described in further detail below. However, as set forth above, it is to be appreciated that the systems 10 are not limited to use in FCC units. As such, the particulate vessel 16 may be any type that is suitable for receiving and containing the particulate material 14 therein.

The particulate material distributor 12 includes a declined header 20 that defines a plurality of orifices 22 that are spaced along a length L of the declined header 20 for accommodating flow of particulate material 14 from the declined header 20. By "declined", it is meant that the declined header 20 has a descending slope from a point 30 where the particulate material 14 enters the declined header 20 in a direction of flow of the particulate material 14 into the particulate vessel 16. The declined nature of the declined header 20 not only promotes flow of particulate material 14 through the declined header 20, but also enables flow differentiation through the plurality of orifices 22 based upon the level of particulate material 14 in the particulate vessel 16, as described in further detail below. In an embodiment, as shown in FIG. 1, the declined header 20 has a rise to run ratio of from about −0.5:10 to about −2:10.

In an embodiment, the declined header 20 has a static rise to run ratio during operation of the system 10, i.e., during introduction of the particulate material 14 into the particulate vessel 16 through the declined header 20. In this embodiment, the declined header 20 maintains a constant position in the particulate vessel 16 during introduction of the particulate material 14 into the particulate vessel 16 through the declined header 20. The static rise to run ratio of the declined header 20 provides for set locations of the plurality of orifices 22 within the particulate vessel 16, which the vessel level controller 18 may rely upon to control the level of the particulate material 14 in the particulate vessel 16.

Figure 2:
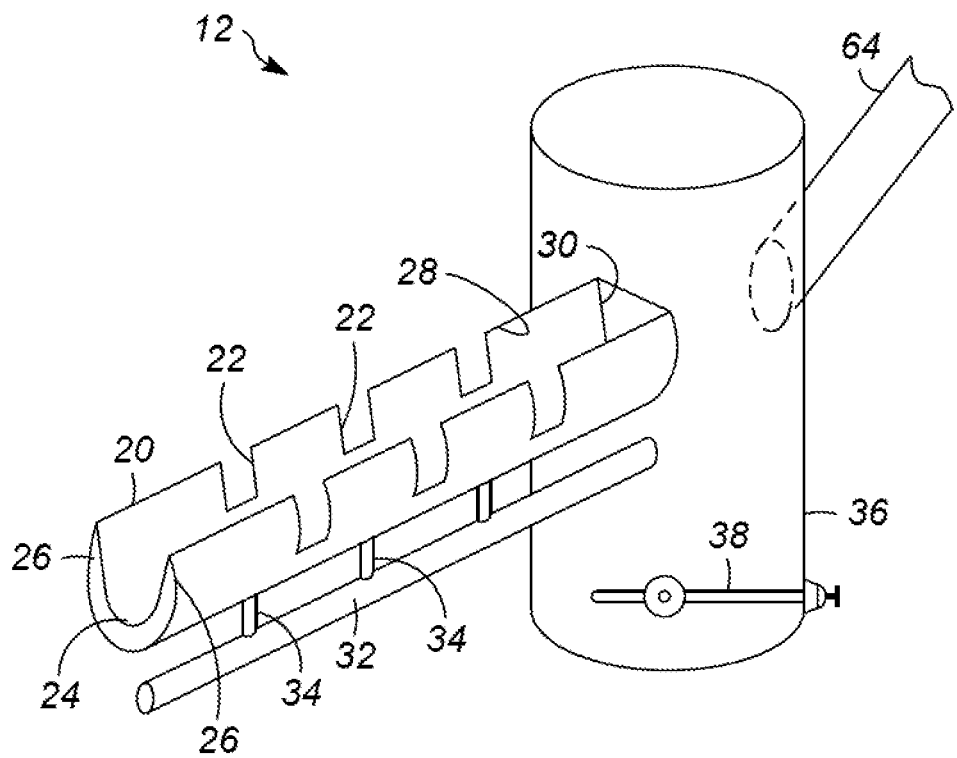
FIG. 2 is a schematic perspective view of a declined header and fluidized hopper in accordance with one embodiment.

In an embodiment, as best shown in FIG. 2, the declined header 20 includes a trough 24 and header sidewalls 26 that extend from the trough 24. In this embodiment, the declined header 20 may have a U-shaped cross-sectional profile on a plane that extends through the trough 24 and the header sidewalls 26. Thus, the declined header 20 may have an open top 28, along the length L thereof, with the open top 28 opening into the particulate vessel 16. In another embodiment, although not shown, the declined header 20 may be enclosed with the header sidewalls 26 connected through a top wall on an opposite end of the header sidewalls 26 from the trough 24.

In an embodiment, as shown in FIG. 1, at least one of the header sidewalls 26 defines the plurality of orifices 22 of the declined header 20. More specifically, the plurality of orifices 22 may be defined in a single header sidewall 26, or may be defined in both header sidewalls 26 of the declined header 20. In this embodiment, the particulate material 14 flows in a substantially horizontal direction through the orifices 22 and into the particulate vessel 16. In another embodiment, although not shown, the trough 24 may define the plurality of orifices 22, in which case the particulate material 14 flows in a substantially vertical direction through the orifices 22 and into the particulate vessel 16. It is to be appreciated that the plurality of orifices 22 may be defined by both the trough 24 and one or more header sidewalls 26.

The spacing of the plurality of orifices 22 along the length L of the declined header 20 provides multiple exit paths for the particulate material 14 from the declined header 20 at different elevations within the particulate vessel 16. For example, an orifice 22 that is distal to the point 30 where the particulate material 14 enters the declined header 20 will be lower within the particulate vessel 16 than an orifice 22 that is proximal to the point 30 where the particulate material 14 enters the declined header 20. Based upon the level of particulate material 14 in the particulate vessel 16, flow of particulate material 14 through the plurality of orifices 22 can be controlled. For example, when the level of particulate material 14 in the particulate vessel 16 is below a particular orifice 22, flow of particulate material 14 through that orifice 22 will be unimpeded. However, when the level of particulate material 14 in the particulate vessel 16 is above a particular orifice 22, flow of particulate material 14 through that orifice 22 will be blocked, with flow of particulate material 14 relegated to orifices 22 that remain above the level of particulate material 14 in the particulate vessel 16 (or over the top of the header sidewalls 26 when the declined header 20 has the open top 28). Because the orifices 22 are spaced along the length L of the declined header 20, the plurality of orifices 22 are also horizontally spaced within the particulate vessel 16. In this regard, the vessel level controller 18 can control horizontal distribution of the particulate material 14 in the particulate vessel 16 through adjustment of the level of particulate material 14 in the particulate vessel 16.

The particulate material distributor 12 may include additional features to promote flow of particulate material 14 through the declined header 20. For example, in an embodiment and as shown in FIG. 1, the declined header 20 includes an aeration lance 32 that extends along the length L of the declined header 20. The aeration lance 32 may extend along an entire length L of the declined header 20, or may only extend along a portion of the length L of the declined header 20. The aeration lance 32 may include a plurality of nozzles 34 that are in fluid communication with particulate material 14 in the declined header 20 for fluidizing the particulate material 14, which enables the particulate material 14 to flow smoothly through the declined header 20.

The particulate material distributor 12 may also include a fluidized hopper 36 in fluid communication with the declined header 20 for providing fluidized particulate material 14 to the declined header 20. The fluidized hopper 36 may promote flow of particulate material 14 through the declined header 20 by providing a controllable source of particulate material 14 to the declined header 20. The fluidized hopper 36 may include an air distributor 38 located at the bottom of the fluidized hopper 36 to fluidize the particulate material 14 therein prior to introducing the particulate material 14 into the declined header 20. The fluidized hopper 36 may be open at the top to provide an alternate contingency means for particulate material transport into the particulate vessel 16.

When the particulate material distributor 12 includes the fluidized hopper 36, the particulate material distributor 12 may include an additional declined header 20 in fluid communication with the fluidized hopper 36 to provide a plurality of declined headers 20 in the system 10. The plurality of declined headers 20 may allow for even greater horizontal distribution of particulate material 14 within the particulate vessel 16, and the plurality of declined headers 20 can be designed with different configurations of the plurality of orifices 22, rise to run ratios, etc. to provide further flexibility for horizontal distribution of the particulate material 14 in the particulate vessel 16.

As alluded to above, the vessel level controller 18 controls flow of the particulate material 14 through one or more of the orifices 22 in the header sidewall 26 through adjustment of the level of particulate material 14 in the particulate vessel 16 between the plurality of orifices 22 in the declined header 20. It is to be appreciated that, while the vessel level controller 18 adjusts the level of particulate material 14 between the plurality of orifices 22, the vessel level controller 18 may also adjust the level of particulate material 14 below all orifices 22 or above all orifices 22 as another mode of controlling flow of the particulate material 14 through the plurality of orifices 22.

Vessel level controllers are known in the art and the particular features of the vessel level controller 18 may vary depending upon other factors at issue beyond merely distributing particulate material 14 in the particulate vessel 16. While the particular parameters used by the vessel level controller 18 to adjust the level of particulate material 14 in the particulate vessel 16 may vary from one system to the next, in an embodiment, the vessel level controller 18 includes a particulate level sensor 40 for sensing the level of particulate material 14 in the particulate vessel 16. The particulate level sensor 40 may be used to constantly or periodically sense the level of particulate material 14 in the particulate vessel 16. In this embodiment, as shown in FIG. 1, small batches of particulate material 14 are periodically added to the particulate vessel 16 via a particulate material makeup rate controller 15, which includes a particulate material makeup valve 17. The particulate material makeup rate controller may add particulate material 14 to the particulate vessel 16 separate from the particulate material distributor 12. The vessel level controller 18 includes a particulate material withdrawal valve 19, which is periodically opened to maintain the level of particulate material 14 in the particulate vessel 16 within a narrow band.

In an exemplary embodiment of a method for distributing particulate material 14 into a particulate vessel 16, particulate material 14 is introduced into the particulate vessel 16 with the particulate material distributor 12. A level of particulate material 14 in the particulate vessel 16 is sensed with the vessel level controller 18, such as with the particulate level sensor 40 as described above. The level of particulate material 14 in the particulate vessel 16 is adjusted between the plurality of orifices 22 in the declined header 20 based upon the sensed level of particulate material 14 in the particulate vessel 16 to control flow of the particulate material 14 through one or more of the plurality of orifices 22 in the declined header 20. In accordance with this embodiment, the step of adjusting the level of particulate material 14 in the particulate vessel 16 may include controlling rates of entering particulate material 14 via particulate material makeup valve 17 and rates of exiting particulate material 14 via particulate material withdrawal valve 19.

Figure 3:
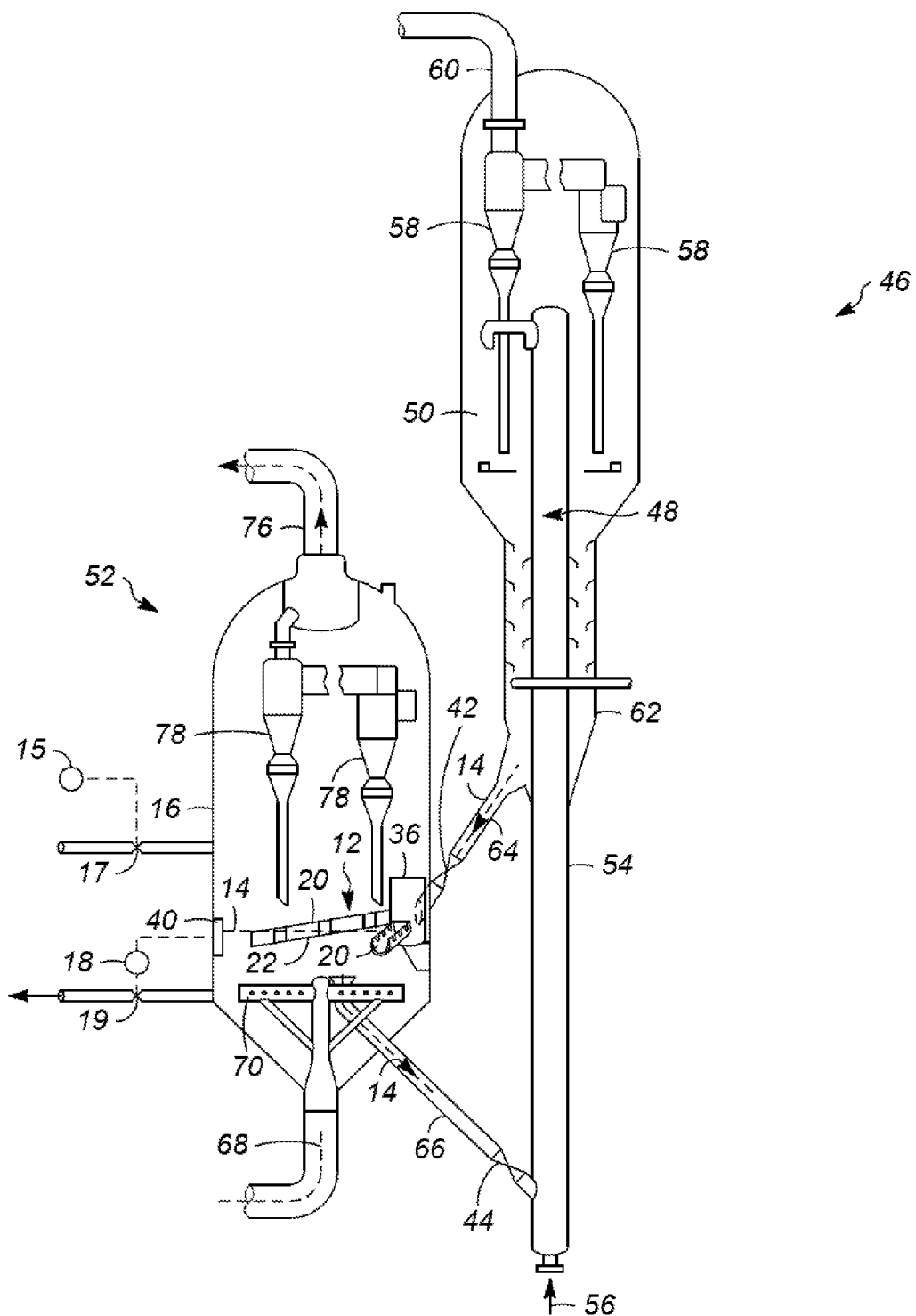
FIG. 3 is a schematic side view of a fluidized catalytic cracking unit in accordance with one embodiment.

In an embodiment, as set forth above and as shown in FIG. 3, FCC units 46 are provided and the system 10 for distributing particulate material 14 into the particulate vessel 16 may be employed in the FCC units 46 for the fluidized catalytic cracking of hydrocarbons. In the FCC units 46, the particulate material 14 may be particulate catalyst. The type of particulate catalyst employed may be chosen from a variety of commercially available catalysts. One example of a suitable catalyst includes a zeolitic base material. In an exemplary embodiment and as shown in FIG. 3, an FCC unit 46 includes a reaction zone 48, a separator vessel 50 in fluid communication with the reaction zone 48, and a regeneration zone 52 in fluid communication with the separator vessel 50 and also in fluid communication with the reaction zone 48.

The reaction zone 48 may include a vertical conduit or riser 54 as the main reaction site, with the separator vessel 50 receiving an effluent from the reaction zone 48 that includes entrained particulate catalyst 14. In the reaction zone 48, particulate catalyst 14 is contacted with a hydrocarbon feed 56, typically at an elevated temperature and at a moderate positive pressure. In an embodiment, the hydrocarbon feed 56 may include a mixture of hydrocarbons having boiling points above about 232° C. The residence time of particulate catalyst 14 and hydrocarbon feed 56 in the riser 54 needed for substantial completion of the cracking reactions is only a few seconds. General operating conditions for the reaction zone 48 in FCC units 46 are known in the art.

The separator vessel 50 separates the particulate catalyst 14 from the effluent. The separator vessel 50 may include a solids-vapor separation device, such as a cyclone 58, which is normally located within and at the top of the separator vessel 50. The products of the reaction are separated from the particulate catalyst 14 by the cyclone 58 and the products may be vented from the cyclone 58 and separator vessel 50 via a product line 60. In an embodiment, the particulate catalyst 14 falls downward to a stripper 62 located in a lower part of the separator vessel 50. The regeneration zone 52, being in fluid communication with the separator vessel 50, receives the particulate catalyst 14 from the separator vessel 50. For example, in one embodiment, the particulate catalyst 14 is transferred to the regeneration zone 52 by way of a first transfer line 64 connected between the regeneration zone 52 and the stripper 62.

Furthermore, the regeneration zone 52, being in fluid communication with the reaction zone 48, passes regenerated catalyst 14 to the reaction zone 48. In the FCC unit 46 as illustrated in FIG. 3, the particulate catalyst 14 is continuously circulated from the reaction zone 48 to the regeneration zone 52 and then again to the reaction zone 48, such as through a second transfer line 66. Particulate catalyst 14 employed in the reaction zone 48 and which is being transferred to the regeneration zone 52 for the removal of coke deposits is referred to as "spent catalyst". The term "spent catalyst" is not intended to be indicative of a total lack of catalytic activity by the particulate catalyst 14. Particulate catalyst 14 that is passed from the regeneration zone 52 to the reaction zone 48 is referred to as "regenerated" catalyst. The spent particulate catalyst 14 charged to the regeneration zone 52 enters a particulate vessel 16 which, for purposes of this embodiment, is a regeneration vessel. In the regeneration vessel 16, the spent particulate catalyst 14 is brought into contact with oxygen-containing regeneration gas 68 that is provided by a regeneration gas nozzle 70, which results in combustion of the coke from the spent particulate catalyst 14. Flue gas 76 formed by combusting the coke may be treated for removal of particulates in regenerator cyclones 78, after which the flue gas 76 may be expelled from the regeneration zone 52. In this embodiment and as shown in FIG. 3, the regeneration zone 52 includes a particulate material distributor 12 for introducing the particulate catalyst 14 into the particulate vessel 16. The particulate material distributor 12 is described in detail above and includes the declined header 20.

In the FCC unit 46 of FIG. 3, the flow of the particulate catalyst 14 out of the regeneration vessel 16 may be at least partially controlled by the position of the outflow valve 44. The flow of particulate catalyst 14 back into the regeneration vessel 16 may be at least partially controlled by the position of the inflow valve 42. There are various schemes for setting the position of the inflow valve 42 and outflow valve 44. In one embodiment, although not shown, the position of the outflow valve 44 is set based on a reactor temperature controller while the position of the inflow valve 42 is set by a reactor level controller. Since the particulate catalyst level is controlled and constant, the circulation of particulate catalyst 14 into the regeneration vessel 16 would equal the flow of particulate catalyst 14 out of the regeneration vessel 16 and, hence, the particulate catalyst level in the regeneration vessel 16 would be essentially constant. If makeup particulate catalyst is not added to the regeneration vessel 16, the particulate catalyst level in the regeneration vessel 16 would gradually decline as cyclones 58 and 78 are imperfect and a small amount of particulate catalyst 14 is continuously lost from the FCC unit 46. Furthermore, particulate catalyst 14 continuously deactivates. Therefore makeup particulate catalyst may be provided to maintain catalyst activity within the FCC unit 46 as well as to maintain the particulate catalyst level in the regeneration vessel 16. The amount of particulate catalyst required to maintain catalyst activity in the FCC unit 46 generally exceeds the amount of particulate catalyst required to maintain the particulate catalyst level in the regeneration vessel 16. Therefore, provided a suitable amount of makeup particulate catalyst is added to the regeneration vessel 16, and even as particulate catalyst is continuously lost through cyclones 58 and 78, the particulate catalyst level in the regeneration vessel 16 will increase over time. To compensate for the rising particulate catalyst level, particulate catalyst 14 is periodically or continuously removed from the regeneration vessel 16 in addition to the particulate catalyst lost through the cyclones 58 and 78. By using the particulate material makeup rate controller 15 (in this embodiment, a particulate catalyst makeup rate controller 15) and the vessel level controller 18 (in this embodiment, a regeneration vessel level controller 18) as described above, the particulate catalyst level can be maintained in the regeneration vessel 16 at the optimal level. In this embodiment, the particulate material withdrawal valve 19 may be further defined as a particulate catalyst withdrawal valve 19. The particulate catalyst makeup rate controller 15 may be employed to automatically add frequent small batches of makeup particulate catalyst 14 to the regeneration vessel 16 while the regeneration vessel level controller 18 may be employed to automatically remove frequent small batches of regenerated catalyst from the regeneration vessel 16. The frequency and size of the automated batch additions and batch removals may be such that the particulate catalyst level in the regeneration vessel 16 is substantially constant. By influencing the particulate catalyst level in the regeneration vessel, the vessel level controller 18 controls flow of the particulate catalyst 14 through one or more of the orifices 22 in the declined header 20 through adjustment of the level of particulate catalyst 14 in the particulate vessel 16.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for distributing particulate material into a particulate vessel, said system comprising:
a particulate material distributor for introducing the particulate material into the particulate vessel, said particulate material distributor comprising a declined header defining a plurality of orifices spaced along a length of said declined header for accommodating flow of particulate material from said declined header;
a vessel level controller for controlling a level of the particulate material in the particulate vessel, said vessel level controller controlling flow of the particulate material through one or more of said orifices in said declined header through adjustment of the level of particulate material in the particulate vessel between said plurality of orifices in said declined header.

2. The system as set forth in claim 1, wherein said declined header comprises a trough and header sidewalls extending from said trough, wherein at least one of said header sidewalls defines said plurality of orifices.

3. The system as set forth in claim 2, wherein said declined header has a U-shaped cross-sectional profile on a plane extending through said trough and header sidewalls.

4. The system as set forth in claim 1, wherein said declined header has a rise to run ratio of from about −0.5:10 to about −2:10.

5. The system as set forth in claim 1, wherein said declined header has a static rise to run ratio during operation of said system.

6. The system as set forth in claim 1, wherein said declined header comprises an aeration lance extending along said length of said declined header, said aeration lance comprising a plurality of nozzles in fluid communication with particulate material therein for fluidizing the particulate material.

7. The system as set forth in claim 1, wherein said particulate material distributor further comprises a fluidized hopper in fluid communication with said declined header for providing fluidized particulate material to said declined header.

8. The system as set forth in claim 7, further comprising an additional declined header in fluid communication with said fluidized hopper.

9. The system as set forth in claim 1, further comprising a particulate material makeup rate controller including a particulate material makeup valve for adding particulate material to the vessel separate from the particulate material distributor.

10. A fluidized catalytic cracking unit for the fluidized catalytic cracking of hydrocarbons, said fluidized catalytic cracking unit comprising:
a reaction zone in which particulate catalyst is contacted with a hydrocarbon feed;
a separator vessel in fluid communication with said reaction zone for receiving an effluent comprising entrained particulate catalyst from said reaction zone and separating particulate catalyst from the effluent;
a regeneration zone in fluid communication with said separator vessel for receiving particulate catalyst from said separator vessel and with said reaction zone for passing regenerated catalyst from said regeneration zone to said reaction zone, said regeneration zone comprising:
a particulate vessel for receiving the particulate catalyst; and
a particulate material distributor for introducing the particulate catalyst into said particulate vessel, said particulate material distributor comprising a declined header defining a plurality of orifices spaced along a length of said declined header for accommodating flow of particulate catalyst from said declined header into said particulate vessel; and
a vessel level controller for controlling a level of the particulate catalyst in said particulate vessel, said vessel level controller controlling flow of the particulate catalyst through one or more of said orifices in said declined header through adjustment of the level of particulate catalyst in said particulate vessel.

11. The fluidized catalytic cracking unit as set forth in claim 10, wherein said declined header comprises a trough and header sidewalls extending from said trough, wherein at least one of said header sidewalls defines said plurality of orifices.

12. The fluidized catalytic cracking unit as set forth in claim 11, wherein said declined header has a U-shaped cross-sectional profile on a plane extending through said trough and header sidewalls.

13. The fluidized catalytic cracking unit as set forth in claim 10, wherein said declined header has a rise to run ratio of from about −0.5:10 to about −2:10.

14. The fluidized catalytic cracking unit as set forth in claim 10, wherein said declined header has a static rise to run ratio during operation of said fluidized catalytic cracking unit.

15. The fluidized catalytic cracking unit as set forth in claim 10, wherein said declined header comprises an aeration lance extending along said length of said declined header, said aeration lance comprising a plurality of nozzles in fluid communication with particulate material therein for fluidizing the particulate material.

16. The fluidized catalytic cracking unit as set forth in claim 10, wherein said particulate material distributor further comprises a fluidized hopper in fluid communication with said declined header for providing fluidized particulate material to said declined header.

17. The fluidized catalytic cracking unit as set forth in claim 16, further comprising an additional declined header in fluid communication with said fluidized hopper.

18. A method for distributing particulate material into a particulate vessel, said method comprising the steps of:
introducing particulate material into the particulate vessel with a particulate material distributor comprising a declined header defining a plurality of orifices spaced along a length of the declined header for accommodating flow of particulate material from the declined header;
sensing a level of particulate material in the particulate vessel with a vessel level controller; and
adjusting the level of particulate material in the particulate vessel between the plurality of orifices in the declined header based upon the sensed level of particulate material in the particulate vessel to control flow of the particulate material through one or more of the plurality of orifices in the declined header.

19. The method of claim 18, wherein the step of adjusting the level of particulate material in the particulate vessel comprises controlling flow rates of particulate material into and out of the particulate vessel.

20. The method of claim 18, wherein the declined header has a static rise to run ratio during introduction of particulate material into the particulate vessel.

* * * * *